(No Model.)

E. M. MURPHY.
FIFTH WHEEL.

No. 558,294. Patented Apr. 14, 1896.

WITNESSES
F. Clough.
D. H. Bradford

INVENTOR
Edward M. Murphy
By Parker & Burton
Attorneys.

UNITED STATES PATENT OFFICE.

EDWARD M. MURPHY, OF PONTIAC, MICHIGAN.

FIFTH-WHEEL.

SPECIFICATION forming part of Letters Patent No. 558,294, dated April 14, 1896.

Application filed August 9, 1895. Serial No. 558,749. (No model.)

*To all whom it may concern:*

Be it known that I, EDWARD M. MURPHY, a citizen of the United States, residing at Pontiac, county of Oakland, State of Michigan, have invented a certain new and useful Improvement in Fifth-Wheels; and I declare the following to be a full, clear, and exact description of the invention, such as will enable others skilled in the art to which it pertains to make and use the same, reference being had to the accompanying drawings, which form a part of this specification.

This invention relates to the bearing for vehicles commonly known as the "fifth-wheel," and has for its object improvements which adapt the parts to a wider range of use in vehicles of different sizes, style, and weight, and enable the workman to assemble the parts more readily and easily.

Figure 4:
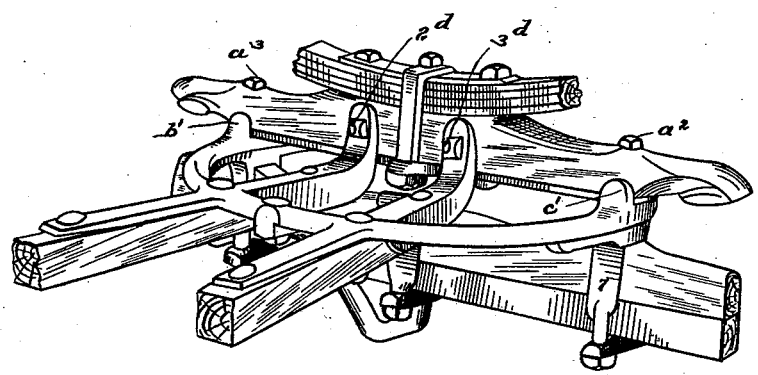
Figure 1:
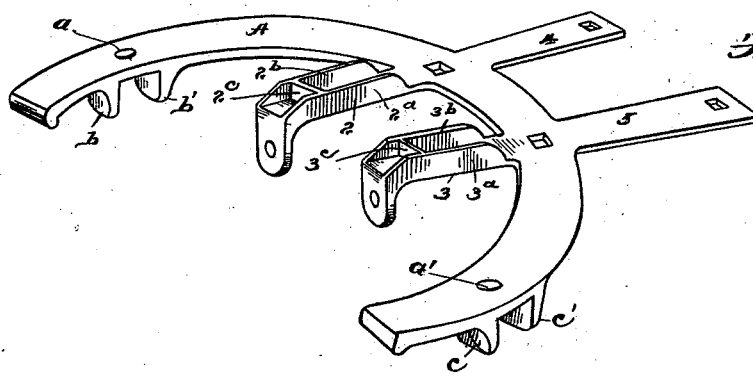
Figure 2:
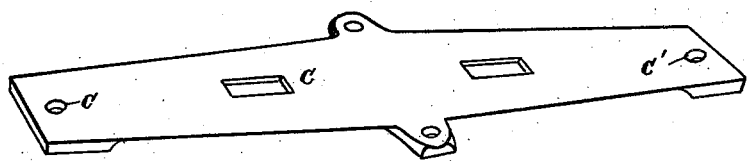
Figure 3:
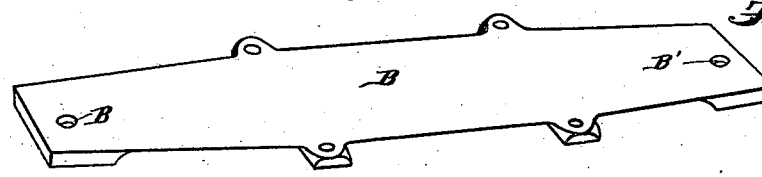

In the drawings, Figure 1 is a perspective of the upper bearing. The piece is shown inverted from the position it occupies in a vehicle. Fig. 2 shows one form of head-block plate. Fig. 3 shows another form of head-block plate. Fig. 4 shows the bearing in position with head-block and reach-bars attached.

Either of the two forms of head-block plate may be used with the bearing-plate, that shown in Fig. 2 being adapted for what is known as a "two-part" coupling and that shown in Fig. 3 being adapted for what is known as a "three-part" coupling. The springs that are selected for use in a particular vehicle are proportioned in width to the desired strength of the vehicle. The same-sized reach-rods may be used in light vehicles that are used in heavier ones, but the springs are proportioned to the strength or size of the vehicle. The head-block corresponds with the springs, and the head-block plate, Fig. 2 or 3, corresponds to the head-block. Heretofore in the most approved forms of bearings the head-block plate has been made integral with the bearing-plate and reach-bar sockets, and consequently it has been necessary to make for each variety of head-block plate as many different patterns or sizes as there are different widths of spring. With my invention a single size of bearing is adapted to be used with springs of any width and strength that will be employed with the ordinary constructions of buggies or light wagons.

A indicates the bearing-ring, technically called the "D" part of the wheel, made in the form of a segment of a circle of which the center is on a line drawn from the center of the hole $a$ to the center of the hole $a'$ and midway between those points. On the upper side of the ring A, at each side of the holes $a\,a'$, are brace-lugs $b\,b'\,c\,c'$, each pair of which forms a socket to aid in holding the end of the head-block plate and the head-block.

2 and 3 indicate reach-sockets, the inner ends of which turn in brace form, and the inner or forward faces of which are in a plane slightly back of the plane of the inner faces of the braces $b'\,c'$. The upturned arm of each brace has a bolt-hole through it. The horizontal arms 4 and 5 extend backward, diverging somewhat across the D part A, and are made integral therewith. That part of the horizontal branch of each arm which lies inside the ring is finished with side wings $2^a$ $2^b\,3^a\,3^b$ and with a cross abutment $2^c\,3^c$, the three parts forming a socket to aid in holding the end of the wooden reach-rods.

The head-block plate B or C is provided with bolt-holes $B'\,B^2\,C'\,C^2$, that register with the holes $a\,a'$, and a head-block dressed to correspond with a spring of chosen width, and the spring is placed in position with respect to the holes $a\,a'$.

Usually the three parts, spring, head-block, and head-block plate, will have been clipped together before they are bolted to the ring. This may be done by putting the parts in a vise and using a socket-wrench to turn the various bolts or burs. The bolts $a^2\,a^3$, previously inserted from below, and the bolts $2^d\,3^d$ are then secured by burs, and this part of the assembling is complete. The under bearing part, consisting of the clips (one of which is seen at 7 in Fig. 4) that clip the axle, do not differ from those that have been heretofore used.

I am aware that a fifth-wheel with the head-block plate made integral with the ring is in common use, and my invention consists in making a ring that can be used with any one of a large number of different sizes and characters of such head-block plates, thereby amplifying the use of the article greatly. I am also aware that a fifth-wheel has been made in which the head-block plate is made integral with the socket-arms of the reach-bars and with the ends separated from the rings or D part of the bearing.

What I claim is—

A bearing for a fifth-wheel, comprising a ring provided with the inward-projecting brace-terminated reach-sockets adapted to abut against the head-block, and with head-block-plate sockets adapted to receive a head-block plate and head-block, as specified.

In testimony whereof I sign this specification in the presence of two witnesses.

EDWARD M. MURPHY.

Witnesses:
CHARLES F. BURTON,
FRANCES CLOUGH.